United States Patent [19]

Petersson

[11] Patent Number: 4,484,407

[45] Date of Patent: * Nov. 27, 1984

[54] CONNECTION ELEMENT FOR ASSEMBLING TOYS

[75] Inventor: Nils A. I. Petersson, Killeberg, Sweden

[73] Assignee: Brio Toy AB, Osby, Sweden

[*] Notice: The portion of the term of this patent subsequent to Dec. 7, 1999 has been disclaimed.

[21] Appl. No.: 479,466

[22] Filed: Mar. 28, 1983

[51] Int. Cl.³ .......................... A63H 33/10; F16B 7/00
[52] U.S. Cl. ..................... 446/122; 403/297; 403/292
[58] Field of Search ............... 46/23, 26, 29, 31, 16, 46/17; 403/292, 297, 298, 293, 71, 354

[56] References Cited

U.S. PATENT DOCUMENTS

| | | | |
|---|---|---|---|
| 2,313,307 | 3/1943 | Wilkinson | 403/297 |
| 3,195,266 | 7/1965 | Onanian | 46/29 |
| 4,050,184 | 9/1977 | Chiari | 46/23 |
| 4,068,346 | 1/1978 | Binder | 403/292 |
| 4,214,404 | 7/1980 | Fischer | 46/26 |
| 4,334,868 | 6/1982 | Levinrad | 46/31 |
| 4,361,979 | 12/1982 | Petersson | 46/26 |

Primary Examiner—Mickey Yu
Attorney, Agent, or Firm—Laurence R. Brown

[57] ABSTRACT

The problem of providing a greater tolerance in the hole diameters of toy blocks held together by frictionally fitting resiliently deformable connector elements is resolved by connector structural features. Thus, the connector element has a hollow cylindrical body of resiliently deformable plastic with separate slots extending axially along the cylindrical circumferential walls on diametrically opposite sides of the cylindrical body and at opposite ends. This provides independent conformation to mating block holes for each end so that entry of one end into a smaller hole will not deform the connector to decrease friction at the opposite end, and thus a tight fit will result in a larger hole.

3 Claims, 5 Drawing Figures

CONNECTION ELEMENT FOR ASSEMBLING TOYS

FIELD OF THE INVENTION

This invention relates to a connection element which facilitates the assembly of toy units provided with holes of substantially equal diameter, said connection element having parts of generally cylindrical shape and of a diameter such as to cause a secure and tight fit when mounted in said holes.

BACKGROUND OF THE INVENTION AND DESCRIPTION OF PRIOR ART

Toy units in the form of kits have long been marketed as items of fun and amusement, especially intended for young children. Such kits enable children to construct models which simulate actual buildings, machines, equipment, living conditions. They even allow children to make constructions of their own imagination. The well-known "Meccano" and "Tinker Toy" kits are examples of such kits. These earlier kits suffered from certain design deficiencies which, sometimes, made assembly of the parts most difficult. Primarily, the problem existed in the design of the connecting elements which, frequently, did not properly fit the holes provided in the toy units. These connection elements were often difficult to fit or remove or, even once fitted, often did not afford a secure and tight fit. Also, the connection elements were sometimes of such awkward shape and improper design that the possibilities of making variations in the constructions were substantially limited.

U.S. Pat. No. 4,361,979—Nils A. I. Petersson—Dec. 7, 1982 shows a connection element specifically designed to alleviate the aforementioned problems. That connection element consisted of parts of generally cylindrical shape, with a diameter such as to cause a tight fit when mounted in the holes of the toy units to be connected. In order to obtain the capability of being compressed into the holes of the toy unit, an axially extending slot was provided throughout the entire length of the connector. The connector could, therefore, be compressed slightly, to facilitate insertion into the hole and, on release of the compression, creates a tight and secure fit.

The connector described in the cited reference had difficulties, however, in connecting elements in which the hole of one element was slightly larger than the hole of the other element. In this case, when the plug was compressed at one end and inserted into the smaller hole, the other end of the plug was also compressed, thus creating a loose, insecure connection at the point of the larger hole.

Due to manufacturing tolerances, the said holes in the elements will almost always vary in diameter. It is therefore an object of this invention to improve the connector of the cited reference to overcome the problem of accommodating wider tolerances of receptacle holes in the toys.

Also holes may change tolerance due to wear.

BRIEF DISCLOSURE OF THE INVENTION

A substantially cylindrical and resilient connector element with flexibility at two opposite ends for frictionally fitting into receptacle holes of two toy building elements is provided. In order to provide an ability of the plug to accommodate holes of wide tolerances thereby which vary in diameter, the connector has independently acting fittings at opposite ends. Thus, two axially overlapping slots at different circumferential locations are provided for independently adapting to hole dimensions over a considerable range of manufacturing tolerances without interaction when two connector holes are of different sizes.

This improvement in the connector plug allows one end of the plug to be compressed without compressing the opposite end of the plug. Thus, when one end of the plug is inserted into a small hole, the other end of the plug can adapt without reduced friction into holes of increased diameter. This feature allows the plug to securely connect two elements which may have holes with diameters at extreme ends of a manufacturing tolerance gap.

BRIEF DESCRIPTION OF THE INVENTION

THE PREFERRED EMBODIMENT

Figure 1:
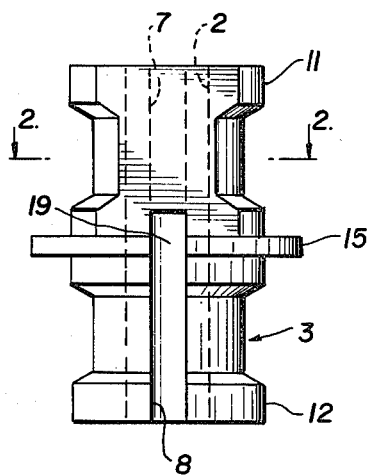
FIG. 1 is an elevation view of the generally cylindrical toy connector element embodying the invention.

As seen from the drawing, the invention resides in a toy connecting element having a coaxially arranged flange extended from a generally cylindrical shaped body 3 a thin disc shaped flange 15 of substantially larger diameter, provided between two end fitting portions 11, 12 of generally cylindrical shape. The flange 15 extends normally to the axis of the cylindrical shaped connection element which has a hollow axial interior passage 2 passing through the cylindrical body 3.

Figure 3:
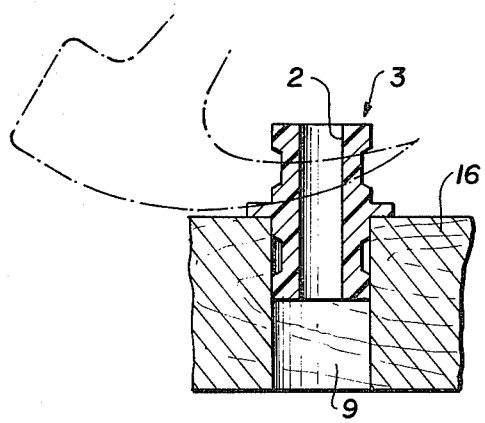
FIG. 3 is a section view of the connector element fitted into a mating aperture in a toy block.
Figure 5:
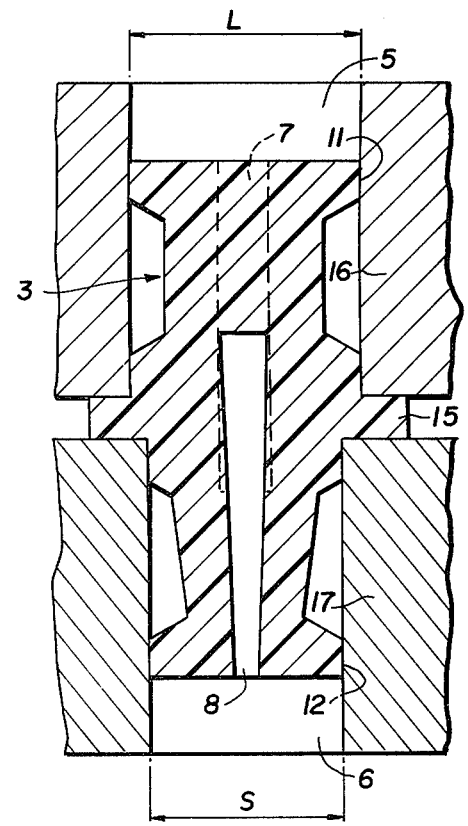
FIG. 5 is an elevation view in section showing the connector element feature of adapting to mating holes of various sizes within a tolerance range.
Figure 4:
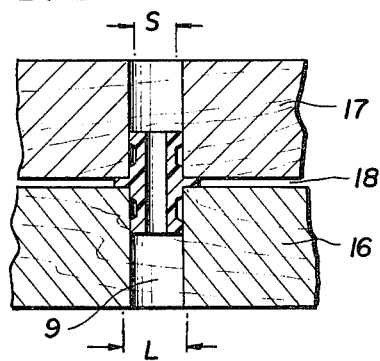
FIG. 4 is a section view of the connector element holding together two blocks.

As seen from FIGS. 3 and 4, the connecting element fits into a mating hole 9 in a toy block 16, and serves to fit two blocks 16, 17 together by frictional engagement into the holes 9 with a spacing 18 between the blocks 16, 17 as provided by the flange 15 which resides therebetween. As seen from FIG. 4, the holes 9 of the inexpensive toy blocks 16, 17 cannot be made precisely of the same dimension, but vary in diameter within a specified tolerance range illustrated by the S (smaller) and L (larger) diameter holes in blocks 17, 16, respectively, as will later be described in more detail with reference to FIG. 5. These varying diameters produce a problem unresolved by prior art cylindrical body toy connector elements of this type, since the tendency of prior art connector elements is to squeeze into the smaller hole S, and thus reduce the entire cylindrical body diameter so that a tight frictional fit in the larger hole L is not possible. This invention resolves that problem.

Thus, in accordance with this invention separate and independent resiliency producing structure is produced at the opposite mating ends 11, 12 of the connector element to adapt independently into receptacle holes 9 of different sizes. Therefore, two axially over-lapping slots 7 and 8 are provided at different circumferential locations on the cylindrical body 3, preferably on diametrically opposite sides of the connection element cylindrical body 3. As seen from FIG. 2, the slots pass through the midsection flange 15 on opposite sides of the cylindrical body. The slots thus begin at opposite ends of the element and run approximately two-thirds of its length to overlap at the midsection 19.

Figure 2:
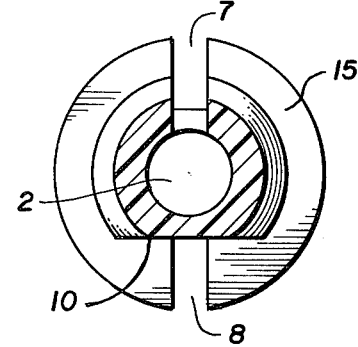
FIG. 2 is a top section view of the connector element taken along lines 2—2 of FIG. 1.

For enabling the diameter of the cylindrical body at each end to decrease to enter and then expand resiliently to frictionally fit into a mating hole 9, a reduced thickness wall 10 is provided in the cylindrical body outer wall opposite the slots 7, 8 at the respective ends 11, 12, as seen for the upper end 11 from FIG. 2. The connector element body 3 is made of an elastically deformable synthetic resin, for example, a polyamide.

Various advantages of the connecting element, flange, shape, etc. as described in U.S. Pat. No. 4,361,979 are retained while resolving the serious problem of adapting the connector element to a much greater tolerance range of hole sizes 9. This operational feature as provided by the element structure is illustrated in exaggerated form in FIG. 5.

As may be seen the upper slot 7 at end 11 of the cylindrical body 3 is expanded to tightly fit into upper hole 5 of block 16, whereas the lower slot 8 is compressed to enable the lower end 12 to enter a smaller hole 6 of block 17. It is evident that the slot structure provided by this invention permits the connector element to frictionally hold different toy blocks even when the holes are of significantly different diameter. Thus the manufacturing tolerance of toy blocks is made significantly greater by means of the improved connector afforded by this invention.

Having therefore advanced the state of the art, those novel features believed descriptive of the nature and spirit of the invention are defined with particularity in the appended claims.

I claim:

1. A connector element for connecting together toy units which are provided with holes of substantially different diameters within a manufacturing tolerance limit, said connector element comprising in combination, a generally cylindrical shape body of elastically deformable material of a diameter greater than that of said holes thereby to cause a tight fit when inserted into said holes, a coaxially arranged flange of substantially larger diameter than the cylindrical diameter provided between two opposite end portions of the generally cylindrical shaped body each having a circumferential segment, said flange extending outwardly in directions perpendicular to the common axis of said generally cylindrically shaped body and adapted to abut and support opposed surfaces of two toy units to be held together by said connector element and thereby separate them, each of the opposite end portions having a reduced thickness circumferential segment axially disposed between the end and the flange at different circumferential positions about the cylindrical body adapted to permit greater flexibility of the cylindrical body, and two axially disposed slots disposed in the cylindrical body on opposite sides from the circumferential segments, and extending from opposite ends into the cylindrical body to permit by the connector element body resiliency a reduction of the size of the cylindrical body at a single end when under a force thereby for positioning the connector element ends into the holes of the toy units and to allow the connector to securely connect two toy units with holes of varying diameters.

2. The connector element of claim 1 wherein said slots are disposed on diametrically opposite sides of the cylindrical body.

3. The connector element of claim 1 wherein the slots extend approximately two thirds of the length of the cylindrical body, extend through the flange, and overlap in the midsection portion of the cylindrical body.

* * * * *